(12) United States Patent
Aoki et al.

(10) Patent No.: US 8,022,989 B2
(45) Date of Patent: Sep. 20, 2011

(54) METHOD AND APPARATUS FOR CONTROLLING DATA DELIVERY WITH USER-MAINTAINED MODES

(75) Inventors: Paul M Aoki, Berkeley, CA (US); Rebecca E Grinter, Atlanta, GA (US); Margaret H Szymanski, Santa Clara, CA (US); James D Thornton, Redwood City, CA (US); Allison G Woodruff, Berkeley, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1503 days.

(21) Appl. No.: 11/423,422

(22) Filed: Jun. 9, 2006

(65) Prior Publication Data

US 2007/0040892 A1 Feb. 22, 2007

Related U.S. Application Data

(60) Provisional application No. 60/709,034, filed on Aug. 17, 2005.

(51) Int. Cl.
*H04N 7/18* (2006.01)
(52) U.S. Cl. ........................................ 348/158
(58) Field of Classification Search .................. None
See application file for complete search history.

(56) References Cited

U.S. PATENT DOCUMENTS

| | | | |
|---|---|---|---|
| 5,944,791 A | 8/1999 | Scherpbier | |
| 6,411,989 B1 | 6/2002 | Anupam et al. | |
| 6,560,707 B2 | 5/2003 | Curtis et al. | |
| 6,687,739 B2 | 2/2004 | Anupam et al. | |
| 6,769,130 B1 | 7/2004 | Getsin et al. | |
| 6,772,335 B2 | 8/2004 | Curtis et al. | |
| 6,898,642 B2 | 5/2005 | Chafle et al. | |
| 6,988,216 B2 | 1/2006 | Lauder | |
| 7,225,225 B2 | 5/2007 | Kuki et al. | |
| 2002/0065065 A1 | 5/2002 | Lunsford et al. | |
| 2002/0129106 A1 | 9/2002 | Gutfreund | |
| 2003/0056220 A1 | 3/2003 | Thornton et al. | |
| 2004/0183749 A1 | 9/2004 | Vertegaal | |
| 2005/0124365 A1 | 6/2005 | Balasuriya et al. | |
| 2005/0188316 A1 | 8/2005 | Ghanamgari et al. | |
| 2006/0034195 A1* | 2/2006 | Blaiotta et al. | 370/261 |
| 2006/0140152 A1 | 6/2006 | Wang et al. | |
| 2006/0236247 A1 | 10/2006 | Morita et al. | |
| 2007/0195697 A1* | 8/2007 | Pesia et al. | 370/235 |

FOREIGN PATENT DOCUMENTS

EP 1545129 6/2005

OTHER PUBLICATIONS

BuddyVision™ Feature Descriptions, available on the Internet at http://www.buddyvision.com/ on Aug. 13, 2005.

(Continued)

*Primary Examiner* — Nhon Diep
(74) *Attorney, Agent, or Firm* — Patrick J.S. Inouye; Krista A. Wittman

(57) ABSTRACT

Communication is carried out using devices with user-maintained modes that enable synchronous content sharing and communication. Each user-maintained mode enables a lightweight interface for positioning content in a conversation by initiating and terminating data transmission through user produced feedback to create a shared conversational experience.

20 Claims, 2 Drawing Sheets

OTHER PUBLICATIONS

Tetsuro Chino et al., "'GazeToTalk': a nonverbal interface with meta-communication facility" (Poster Session), Eye Tracking Research & Application, Proceedings of the 2000 symposium on Eye tracking research & applications, United States, 2000, p. 111.

Comverse Technology Press Release, "Comverse Demonstrates Push to Show™ Video "Walkie-Talkie" Service Using IP Multimedia Subsystem (IMS) Capabilities As Part Of Its Total Communication Portfolio", Oct. 7 2003, available on the Internet at http://www.cmvt.com/news2.asp?id=3&newsid=671.

Pavel Curtis et al., "The Jupiter audio/video architecture: secure multimedia in network places", International Multimedia Conference, Proceedings of the third ACM international conference on Multimedia, San Francisco, California, United States, pp. 79-90, 1995, ISBN:0-89791-751-0.

Robert S. Fish et al., "Evaluating video as a technology for informal communication", Conference on Human Factors in Computing Systems, Proceedings of the SIGCHI conference on Human factors in computing systems, Monterey, California, United States, pp. 37-48, 1992, ISBN:0-89791-513-5.

Baha Jabarin et al., "Establishing remote conversations through eye contact with physical awareness proxies", Conference on Human Factors in Computing Systems, CHI '03 extended abstracts on Human factors in computing systems, Ft. Lauderdale, Florida, USA, Poster Session: Interactive posters: gaze interaction table of contents pp. 948-949, 2003, ISBN:1-58113-637-4.

Lascaux IM Client, "Everyday computing lab—projects", available on the Internet at http://www.cc.gatech.edu/fce/ecl/projects/im/ on Aug. 13, 2005.

Bonnie A Nardi et al., "Interaction and outeraction: instant messaging in action", Computer Supported Cooperative Work, Proceedings of the 2000 ACM conference on Computer supported cooperative work, Philadelphia, Pennsylvania, United States, pp. 79-88, 2000, ISBN:1-58113-222-0.

Lars Novak et al., "MMS—Building on the success of SMS", Ericsson Review No. 3, pp. 102-109, 2001, available on the Internet at http://www.ericsson.com/ericsson/corpinfo/publications/review/2001_03/140.shtml.

Alice Oh et al., "Evaluating look-to-talk: a gaze-aware interface in a collaborative environment", Conference on Human Factors in Computing Systems, CHI '02 extended abstracts on Human factors in computing systems, Minneapolis, Minnesota, USA, Poster Session: Interactive Posters, pp. 650-651, 2002, ISBN:1-58113-454-1.

Sellen A. et al., "The Prevention of Mode Errors Through Sensory Feedback," Human Computer Interaction 7(2), pp. 141-164, 1992.

Allison Woodruff et al., "How push-to-talk makes talk less pushy", Conference on Supporting Group Work, Proceedings of the 2003 international ACM SIGGROUP conference on Supporting group work, Sanibel Island, Florida, USA, Session: Chat II, pp. 170-179, 2003, ISBN:1-58113-693-5.

Singer et al., "Tangible Progress: Less is More in Somewire Audio Spaces," SIGCHI 1999, pp. 104-111, ACM.

Kortuem et al., "NETMAN: The Design of a Collaborative Wearable Computer System," Mobile Networks and Applications 4, pp. 49-28, ACM, 1999.

Sawhney et al., "Nomadic Radio: Speech and Audio Interaction for Contextual Messaging in Nomadic Environments," TOCHI, vol. 7, No. 3, pp. 353-383, ACM, Sep. 2000.

Patterson et al., "Voice Loops as Coordination Aids in Space Shuttle Mission Control," Computer Supported Cooperative Work 8, pp. 353-371, Kluwer Academic Publishers, Netherlands, 1999.

Nelson et al., "Quiet Calls: Talking Silently on Mobile Phones," SIGCHI 2001, pp. 174-181, ACM, 2001.

Xerox PARC, "Etherphone: Collected Papers 1987-1988," PARC Technical Report CSL-89-2, May 1989.

Vin et al., "Multimedia Conferencing in the Etherphone Environment," IEEE Computer, vol. 24, No. 10, Oct. 1991, IEEE.

* cited by examiner

METHOD AND APPARATUS FOR CONTROLLING DATA DELIVERY WITH USER-MAINTAINED MODES

CROSS REFERENCE TO RELATED APPLICATION

Priority is claimed from U.S. Provisional Application No. 60/709,034, filed Aug. 17, 2005, entitled "Method And Apparatus For Controlling Data Delivery With User-Maintained Modes", by the same inventors and assignee, which is incorporated in its entirety herein by reference.

BACKGROUND AND SUMMARY

The following relates generally to methods, apparatus and articles of manufacture therefor, for controlling audio and video streams with user-maintained modes.

Users of mobile and fixed computing devices have various forms and modes of communication to choose from to communicate. Forms of communication include one or more combinations of text, audio, and video, while modes of communication include full-duplex or half-duplex. Services that exist for offering the various forms and modes of communication include SMS (short message service), MMS (multimedia messaging service), IM (instant messaging, e.g., text messaging), and PTT (push-to-talk, e.g., Direct Connect® Walkie-Talkie offered by Nextel Communications Inc.). These different services may operate using fixed and/or radio communication networks employing one or more communications protocols (e.g., POTS, ISDN, CDMA, GSM and IP).

These different forms and modes of communication allow users to communicate using a variety and combination of styles that require different levels of commitment by the user. For example, full-duplex communication is more user-intrusive and requires greater attention than half-duplex communication. This intrusiveness affects communication more profoundly than simply reducing "privacy"; it affects how one manages the process of getting in and out of interactions. Accepting a connection, or allowing a connection to remain open (e.g., as in a conference call), means that it is socially difficult to deny the other parties' demands on attention. (For further background see: Nardi, B. A., Whittaker, S. and Bradner, E., "Interaction and Outeraction: Instant Messaging in Action," Proc. ACM Conference on Computer Supported Cooperative Work, ACM, pp. 79-88, 2000 (hereinafter "Whittaker"), and Woodruff, A. and Aoki, P. M., "How Push-to-Talk Makes Talk Less Pushy," Proc. ACM SIGGROUP Conf. on Supporting Group Work, ACM, pp. 170-179, 2003 (hereinafter "Woodruff"), which are incorporated herein by reference.)

Much of the social difficulty to deny another party's demands on attention appears to result from the nature of a full-duplex communication channel, not from the real-time aspect of the channel or the fact that the channel is "always open" per se. For example, IM operates using "open," bidirectional channels. Studies of IM use by Whittaker indicate that a key reason why users like IM is that, although the "channel" is open and always available for messages to be sent, information is only passed when messages are actually being sent. Similar results have been seen in studies by Woodruff of the use of half-duplex, "push-to-talk" (PTT) cellular audio communication services. That is, even with an "always open" channel, a channel that limits information transmission to actual messages means that the parties on the other side of the channel cannot "see" back through the channel to determine if a party is present and/or available.

This affordance has come to be known as "plausible deniability". In IM or IM-like systems, it is more socially acceptable to ignore incoming messages, delay responses to incoming messages, or stop responding to messages in the middle of a conversation. Because of "plausible deniability," the other parties have no insight into why a response has not come and generally assume that "something has come up" (e.g., an appointment, a co-present conversation, etc.) that has resulted in the lack of response. This means that communicative availability is more lightweight when using IM or PTT to communicate as opposed to using a telephone or videoconferencing.

While MMS, IM or PTT afford lightweight communication mechanism, solutions for sharing data that are used with these communication mechanisms are directed to their functionality (e.g., messaging, browsing, etc.) rather than to a user's desire to share an experience (e.g., interactive sharing). Further, such lightweight communication mechanisms do not provide the immediacy often desired in conversations with interactive sharing. To satisfy interactive sharing of data during conversations using such lightweight communication mechanisms, users need to be aware that that their information is being shared with the other users that are communicating through active control of data transmission during their conversation. To do so, sharing must be mutual rather than unidirectional. Further, such sharing must be done by allowing users to position data in an interaction so that their content is visibly relevant within a sequence of contributions. Doing so allows users in a conversation to mutually, rather than unidirectionally, share data, and to direct the focus of their attention throughout the conversation.

Accordingly, there continues to be a need for an improved lightweight communication mechanism for allowing users to have conversations that afford a lower level of commitment than always open systems while enabling users to share an experience while interacting with or referring to data. In accordance with the disclosure herein, there is provided an improved method, apparatus and article of manufacture therefor, for coordinating delivery of multiple streams of data, such as audio and video or combinations thereof, when communicating with another user using user-maintained modes.

In accordance with the various embodiments disclosed herein, there is provided a transmitting electronic apparatus, method and article of manufacture therefor, for communicating data streams (e.g., audio or video) with a receiving electronic apparatus. The transmitting electronic apparatus includes a user-maintained mode for controlling the transmission of different data streams to the receiving electronic apparatus. In operation, while the user-maintained mode actively senses user feedback, the data stream currently being transmitted to the receiving electronic apparatus is suspended and the data stream associated with the user-maintained mode is transmitted in its place. The data displayed at the receiving electronic apparatus is synchronized with the data stream being transmitted to the receiving electronic apparatus to allow users of the transmitting and receiving electronic apparatuses to share the data in a coordinated manner.

In accordance with one aspect of the various embodiments disclosed herein, user-maintained modes are maintained in an active state using sensory feedback detected from a user of the transmitting electronic apparatus that may arise from one or a combination of two or more of measurable tactile, visual, audible, or affective user action. Tactile action may be measured, for example, when a button detects it has been pressed or when an accelerometer attached to a body part detects movement. Visual action may be measured, for example, when image analysis detects eye-gaze on a target. Audible action may be measured, for example, when audio analysis detects a sustained speech or non-speech sound. Affective action may be measured, for example, when a skin response sensor or an acoustic voice stress analyzer detects a sustained biological response.

BRIEF DESCRIPTION OF THE DRAWINGS

These and other aspects of the disclosure will become apparent from the following description read in conjunction with the accompanying drawings wherein the same reference numerals have been applied to like parts and in which.

DETAILED DESCRIPTION

A. Definition Of Terms

The terms defined below have the indicated meanings throughout this application, including the claims and the figures:

"Video" is used herein to mean a series of images or a single image.

"User-maintained mode" is used herein to mean a mode control that is placed in "active" or "on" state in the presence of detected feedback indicating a user-maintained action; the mode control is placed in an "inactive" or "off" state in the absence of detected feedback indicating a user-maintained action.

"Channel" is used herein to mean a full-duplex or half-duplex transmission path over a network that is established between two or more devices.

B. Conversation System

Figure 1:
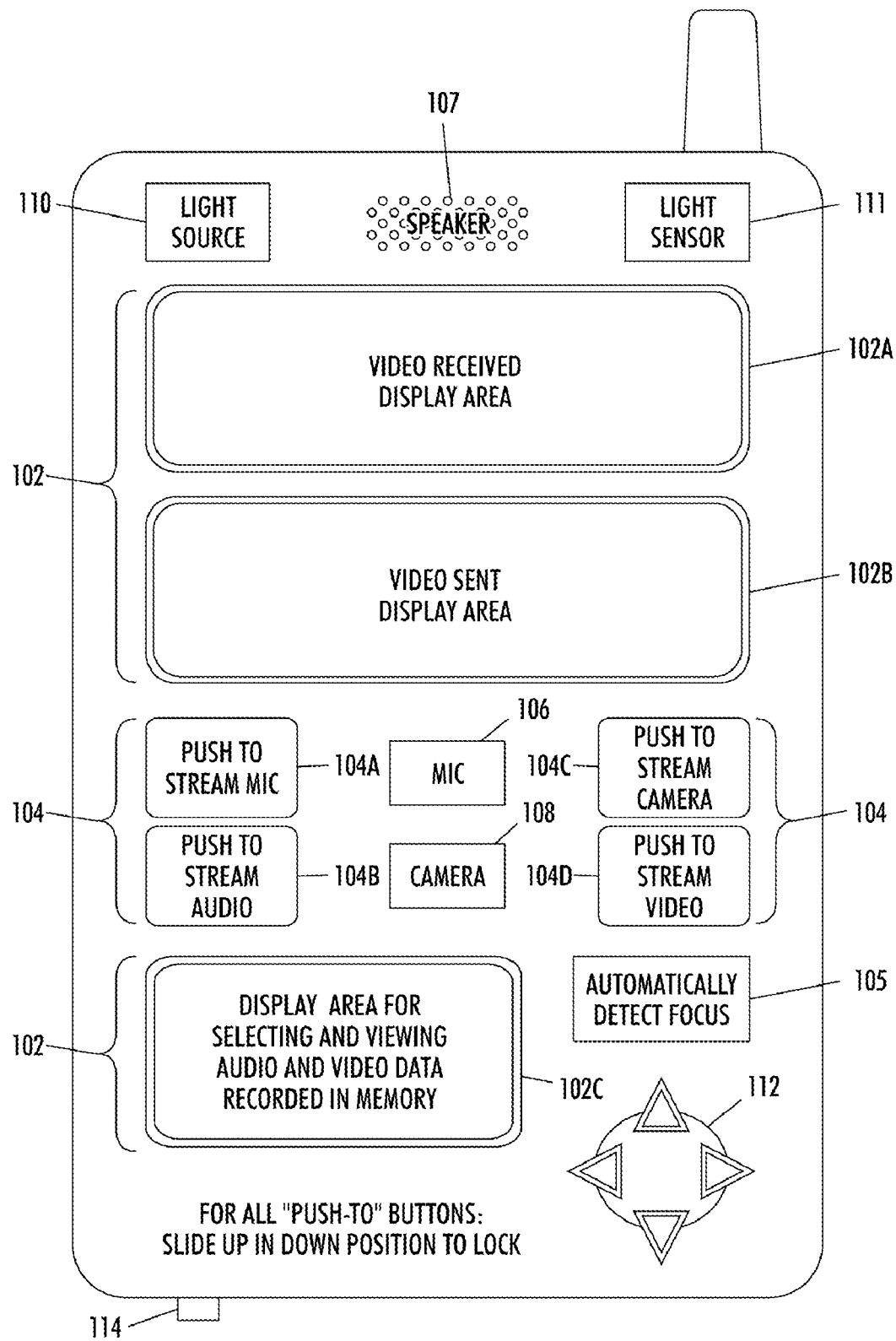
FIG. 1 illustrates a communicator that may be used by each user of multi-party conversation.

FIG. 1 illustrates a communicator (or electronic apparatus) 100 that may be used by each user of multi-party conversation. The communicator 100 may be a mobile or fixed computing device adapted to receive audio and video communications. Depending on the embodiment, the communicator 100 may include one or more sensors for detecting one or more user-maintained modes (UMM). The user-maintained modes are used for transmitting audio and video between communicators participating in a conversation in a synchronous manner (i.e., not in an asynchronous, message-like manner) to produce a shared response between participants, thereby allowing participants in a conversation to react conversationally to content. By synchronizing data (e.g., audio, text, images, and/or video) within a conversation, the user-maintained modes provide an automated mechanism for positioning data as it is referred to within a conversation.

The communicator 100 includes a plurality of display areas 102 for use with user-maintained modes. The display areas 102 may each be a separate display area or viewed as part of a common display area (e.g., for example on a single display screen using a plurality of windows). Each display area may be separate or a combination of one or more display screens that each in turn may be split to represent one or more video scenes, depending on the number of users participating in a conversation. In the embodiment shown in FIG. 1, the display areas 102 include a display area 102A for presenting video received during a conversation, a display area 102B for presenting video sent during a conversation, and a display area 102C for selecting (e.g., with pointer control 112) data that may be accessed from the communicator 100 (e.g., either locally or at a remote location) such as text, audio and video or any combination thereof.

In accordance with the embodiment presented herein, video data transmitted from one communicator to another (or from a remote storage location to both) is synchronized so that users participating in a conversation may have a spontaneous conversation experience (e.g., of viewing a film at the same time) by having video sent and/or received appearing at the same time at the different communicators. This permits users in conversation discussing a film clip to know that they are referring to the same moment in the film without having to synchronize their conversation with the image data being displayed on their communicators. For example, depending on the delay encountered during transmission, projection may be delayed at either the sender's communicator or the recipient's communicator to synchronize viewing of displayed image data at the recipient's and sender's communicators.

Further, the communicator 100 includes a plurality of buttons 104 for activating user-maintained modes. In the embodiment shown in FIG. 1, the buttons 104 are switches that are actively pushed in by a user to activate a user-maintained mode; the buttons automatically return to their inactive state upon release by the user. Alternatively, the buttons 104 may be sensors that detect the presence of a user's touch (e.g., through pressure, capacitance, or heat). The buttons 104 may also permit a user-maintained mode to be disabled (e.g., set in an always-on position) by pushing a button down and sliding it into a locked always-on position.

The buttons 104 control the transmission of various streams of data: the "push-to-stream mic" button 104A activates the recording and/or transmission of audio data recorded by microphone 106; the "push-to-stream audio" button 104B transmits a stream of an audio file selected using the display area 102C that is playing or selected to be played on speaker 107; the "push-to-stream camera" button 104C activates the recording and/or transmission of a captured media stream (e.g., video data recorded by the camera 108 and audio data captured by microphone 106); the "push-to-stream video" button 104D transmits a stream video data selected using the display area 102C that is playing or selected to be played. Data streams controlled with user-maintained modes may be transmitted between communicators 100 using full-duplex or half-duplex channels. Also in data streams, video data may include an additional data component, such as audio, together with the video data.

Also, the communicator may include an eye gaze monitor that may include one or more light sources (e.g., light source 110) and light sensors (e.g., light sensor 111) for recording and detecting the direction of a user's eye gaze, which detected gaze is used to activate a user-maintained mode (e.g., a user-maintained mode is active while eye gaze remains focused on a target). As is known in the art, the light source 110 may be used to emit infrared light that is detected by the light sensor 111 to monitor eye gaze by tracking relative position of detected centers of eye pupils and reflections from the back of eye corneas. In one embodiment, an eye gaze profile may be recorded and associated with each user definable position established when the user buttons 104 are activated, thereafter once calibrated, detected eye gazes on different targets defining different user-maintained modes may be used to automatically activate (and deactivate) transmission of image and voice data during a conversation.

In another embodiment using the known pupil center/corneal reflection (PCCR) method, light sensor 111 is a video camera sensitive to infrared light, which is true of many cameras based on conventional charge-coupled device (CCD) and complementary metal oxide semiconductor (CMOS) image sensors. In yet another embodiment, a single image sensor is used for both performing the operations of camera 108 and light sensor 111. Additional background concerning eye gaze monitoring is set forth in the following publications, all of which are incorporated herein in their entirety by reference: U.S. Patent Application Publication US 2004/0183749 A1, entitled "Method and Apparatus For Communication Between Humans And Devices; Alice Oh, Harold Fox, Max Van Kleek, Aaron Adler, Krzysztof Gajos, Louis-Philippe Morency, Trevor Darrell, "Evaluating Look-To-Talk: A Gaze-Aware Interface In A Collaborative Environment", Proceedings of CHI 2002; Tetsuro Chino, Kazuhiro Fukui, and Kaoru Suzuki, "'GazeToTalk': A Nonverbal Interface with Meta-Communication Facility" (Poster Session) Eye Tracking Research & Applications, 2000; and Baha Jabarin, James Wu, Roel Vertegaal and Lenko Grigorov, "Establishing Remote Conversations Through Eye Contact With Physical Awareness Proxies" CHI Extended Abstracts 2003: 948-949.

Eye gaze monitoring and detection may, for example, be engaged using button 105 for detecting the eye gaze focus carried out by the user on video display area 102A for viewing video received during a conversation and the video display area 102C for viewing video data recorded in memory. As the user's focus changes targets from one video display area to another during a conversation, video transmitted to a user may be made to automatically switch between, for example, recorded video selected for viewing that forms part of a conversation (e.g., a picture or a video clip) and video recorded of the user with the camera 108, thereby automatically positioning relevant image content in a conversation using different eye gaze user-maintained modes.

In addition, the communicator may include one or more input ports 114 for detecting sensory feedback from a user-maintained mode. More generally, examples of mechanisms integrated in the communicator 100 or coupled through the input port 114 for expressing a user-maintained mode (i.e., UMM) may include: tactile, fine motor (e.g., holding down a button, turning a key, pressing a foot pedal, pressing a pressure sensor, touching a heat sensor, monitoring a body position using computer vision, sensing body movement with a haptic device, such as a data glove); tactile, gross motor (e.g., holding a gesture that may be measured by computer vision, detecting movement of a worn accelerometer); visual (e.g., holding eye-gaze on a target that may, for example, be measured by computer vision, an eye-tracker based on Purkinje images, etc.); audible (e.g., sustaining a speech or non-speech sound that may be measured using a sound monitor, which may include one or more of a microphone, a throat-worn vibration sensor, an ultra-short pulse radar directed at the vocal tract); and affective (e.g., sustaining a biological response that may be measured using an affective monitor, which may include one or more of a galvanic skin response sensors, electromyelogram sensors, or an acoustic voice stress analyzer). A common element of these mechanisms for detecting a user-maintained mode is that the user must maintain an action, typically one involving kinesthetic feedback, for as long as the user wants the modal operation to continue.

C. Operating with User-Maintained Modes

Figure 2:
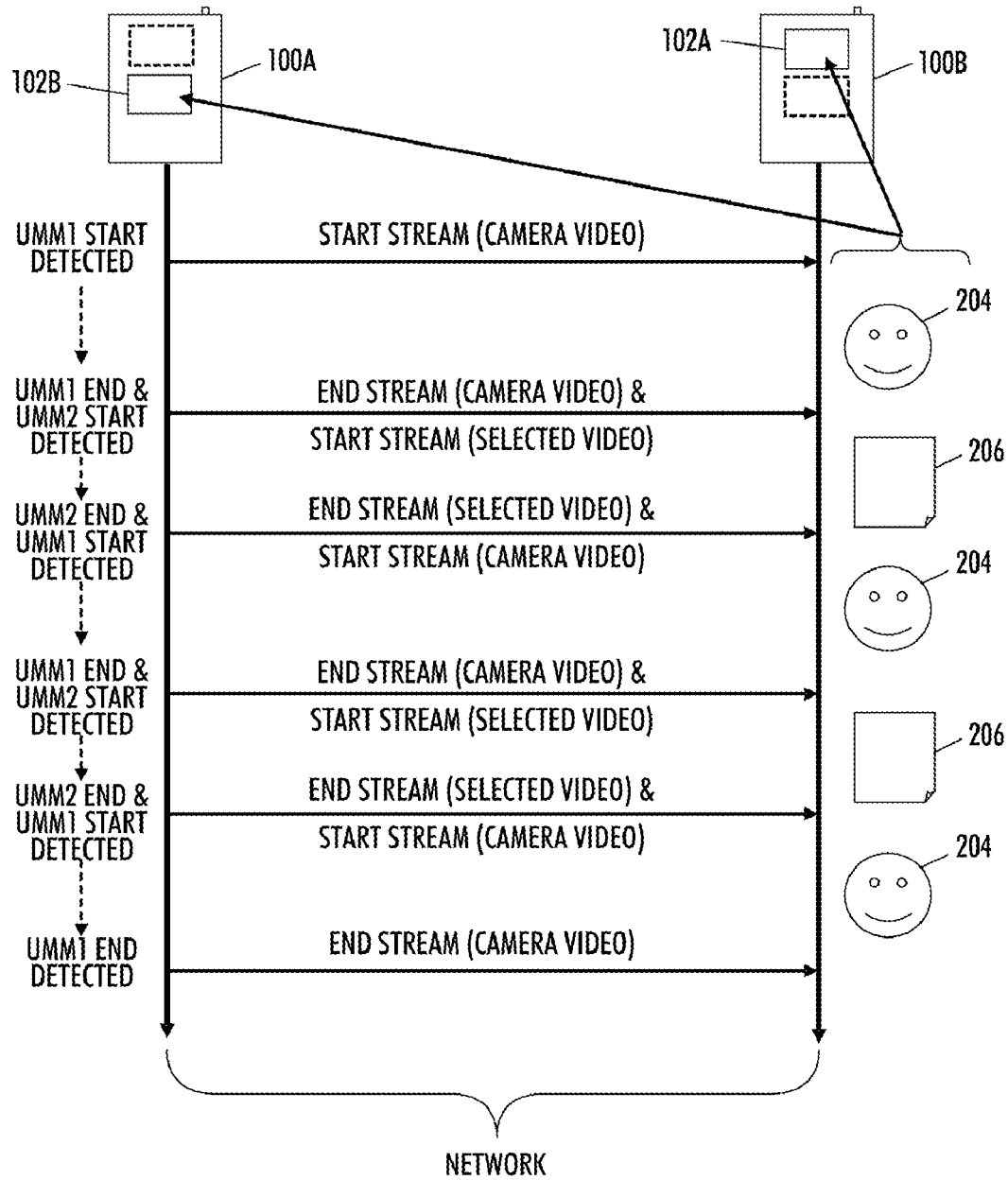
FIG. 2 illustrates a method for carrying out a conversation using user-maintained modes.

FIG. 2 illustrates a method for carrying out a conversation using user-maintained modes. The method shown in FIG. 2 illustrates use of a first user-maintained mode (UMM1), activated on communicator 100A using push-to-stream camera button 104C (shown in FIG. 1), and a second user-maintained mode (UMM2), activated on communicator 100A using push-to-stream video button 104D (shown in FIG. 1). As set forth previously, video displayed on outgoing display 102B of communicator 100A and incoming display 102A of communicator 100B are coordinated after transmission is initiated using UMM1 and UMM2.

More specifically, FIG. 2 illustrates one manner of toggling between video 204 recorded by camera 108 of the user operating the communicator 100A and video 206 (e.g., of a selected document or image) recorded in memory of the communicator 100A using UMM buttons 104C and 104D. When toggling between the different image data 204 and 206 in a conversation with the user of the communicator 100B, the user of communicator 100A is able to synchronously position the different image data 204 and 206 in the conversation as it becomes relevant by toggling between activating and deactivating UMM1 and UMM2.

In another embodiment, the UMM buttons 104C and 104D shown in FIG. 1 may be a single button instead of two buttons with a toggle between activating UMM1 and UMM2. In yet another embodiment, one of the buttons 104C or 104D may be placed in a locked position (i.e., effectively turning off its UMM state since no user feedback is required by the user to maintain it) while the user of communicator 100A activates (i.e., starts) and then deactivates (i.e., ends) the other unlocked UMM to intersperse data 206 in the "always on" image data stream 204. In this embodiment, the active UMM button effectively acts as an interrupt to suspend the always-on image data stream and intersperse alternate image data. In yet a further embodiment, both UMM buttons 104C and 104D may be simultaneously activated causing the transmission and subsequent display of two streams simultaneously on outgoing display 102B of communicator 100A and incoming display 102A of communicator 100B.

D. Alternate Operating Embodiment

In an alternate operating environment, the communicators 100 may operate using the "System And Method For Sharing And Controlling Multiple Audio And Video Streams", disclosed in U.S. Pat. No. 7,574,474 to Thornton et al., which is incorporated in its entirety herein by reference. This alternate operating environment supports lightweight multimedia content sharing between wireless devices in a synchronized manner, thereby allowing users to react conversationally to content distributed between devices using user-maintained modes to control data streams. In this alternate embodiment, the push-to-stream audio and video buttons 104B and 104D shown in FIG. 1 may be used in conjunction with various schemes for prioritizing selected audio and/or video data depending on the user preferences set on the communicator that may define actions to take related to recorded data based on, for example, time of day, location, parties in communication, transmission delay, and operations being performed.

In one instance of this embodiment, push-to-stream buttons may be used for positioning audio or video side commentary (e.g., using display 102C and pointer control 112 shown in FIG. 1) after a multimedia presentation is accessed from a storage source (e.g., the memory or media frame buffer or communicator 100 shown in FIG. 1) and presented to a user operating a communicator 100, and after which the multiple presentation is simultaneously transmitted to at least one other user operating a communicator. In operation, the communicator 100 may include a control facility and interactive program (as described in U.S. Pat. No. 7,574,474 to Thornton et al.,) adapted to provide users with different modes of synchronization, such as peeking and slaving. Peeking is a temporally short length of time when a user is able to see and hear what another user is viewing or listening to. Slaving is a temporally long length of time when a user is able to connect to receiving communicator and present what user's terminal is presenting. The receiving communicator remains slaved until the user issues a cancel command.

In another instance of this embodiment, each communicator may be adapted to engage in pull modes of sharing data, in addition to push sharing described above and shown in FIG. 2. Pull sharing involves a communicator asking for data, while push sharing involves a communicator sending data with or without the recipient's prior approval or knowledge (e.g., depending on the recipient's profile and system or user status, e.g., on recipient whitelist, participating in a conversation, etc.).

In yet another instance of this embodiment, each communicator 100A and 100B is adapted to store (or pre-store or cache) a local copy of video or image data 206 (e.g., of a selected document, such as a movie clip, or image). In this alternate embodiment, when toggling between the different video or image data 204 and 206, as shown in FIG. 2, only the data recorded in real-time by camera 108 of the user operating the communicator 100A needs to be transmitted to the communicator 100B. Consequently, when a local copy of selected video is stored on the communicator 100B, the communicator 100A may transmit to the communicator 100B the video data stream 206 shown in FIG. 2 by transmitting the time (or position) at which play should start and end on the local copy of the selected video.

E. Miscellaneous

Advantageously using the communicator 100 shown in FIG. 1, the user of the communicator 100 is able to interject different forms of data (e.g., audio and/or video) coming from various sources (e.g., captured or prerecorded) in a conversation using one or more user-maintained modes. Communication is carried out using devices with user-maintained modes that enable synchronous content sharing and communication. Each user-maintained mode enables a lightweight interface for positioning content in a conversation by initiating and terminating data transmission through user produced feedback to create a shared conversational experience.

In synchronizing the interjection of data in a stream with user-maintained modes, users are able to share a similar kind of response in a conversation, which contributes to a more spontaneous conversational experience. A further advantage is that when all communication channels are controlled using user-maintained modes, the interaction as a whole is afforded "plausible deniability". This enables users to manager their responsiveness in a convenient and lightweight manner that is socially acceptable. Note that it is not necessary for the purpose of plausible deniability for the same user-maintained mode that an activating action be applied to all streams or that the channel over which a stream is transmitted be half-duplex (as opposed to full-duplex); instead, it requires only that transmission of each stream be under some form of positive (or active) user control.

Those skilled in the art will recognize that the communicators 100 may be embodied in a wired (e.g., multimedia workstation) or a mobile (e.g., camera phone) general purpose computer, or a combination thereof (e.g., multimedia laptop with a docking station). Such a general purpose computer would include hardware and software. The hardware would comprise, for example, memory (ROM, RAM, etc.) (e.g., for storing processing instructions for operating the user-maintained modes), a processor (i.e., CPU) (e.g., coupled to the memory for executing the processing instructions), persistent storage (e.g., CD-ROM, hard drive, floppy drive, tape drive, etc.), user I/O, and network I/O. The user I/O may include a camera, a microphone, speakers, a keyboard, a pointing device (e.g., pointing stick, mouse, etc.), and the display. The network I/O may for example be coupled to a network such as the Internet. The software of the general purpose computer would include an operating system and application software providing the functions of the user-maintained modes.

Further, those skilled in the art will recognize that the forgoing embodiments may be implemented as a machine (or system), process (or method), or article of manufacture by using standard programming and/or engineering techniques to produce programming software, firmware, hardware, or any combination thereof. It will be appreciated by those skilled in the art that the FIGS. 1 and 2 described in the specification are meant to provide an understanding of different possible embodiments. As such, alternative ordering of the actions, performing one or more actions in parallel, and/or performing additional or fewer actions may be done in alternative embodiments.

Any resulting program(s), having computer-readable program code, may be embodied within one or more computer-usable media such as memory devices or transmitting devices, thereby making a computer program product or article of manufacture according to the embodiment described herein. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts may involve the use of a memory or transmitting device which only embodies program code transitorily as a preliminary or final step in making, using, or selling the embodiments as set forth in the claims.

Memory devices include, but are not limited to, fixed (hard) disk drives, floppy disks (or diskettes), optical disks, magnetic tape, semiconductor memories such as RAM, ROM, Proms, etc. Transmitting devices include, but are not limited to, the Internet, intranets, electronic bulletin board and message/note exchanges, telephone/modem based network communication, hard-wired/cabled communication network, cellular communication, radio wave communication, satellite communication, and other stationary or mobile network systems/communication links.

A machine embodying the embodiments may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the disclosure as set forth in the claims.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A transmitting electronic apparatus for communicating data streams with a receiving electronic apparatus, the transmitting electronic apparatus comprising:
    a camera for recording a first video data stream on a transmitting electronic apparatus;
    a memory for storing at least a portion of a second video data stream;
    a first display area for viewing one of the first and the second video data streams;
    a first user-maintained mode activated by a user on the transmitting electronic apparatus to transmit the one of the first and the second video data streams to a receiving electronic apparatus, wherein the other of the first and the second video data streams is suspended while the first user-maintained mode actively senses user feedback and further wherein the one of the first and the second video data streams displayed in the first display area is synchronized with the one of the first and the second video data streams transmitted to the receiving electronic apparatus to allow the user of the transmitting electronic apparatus and a user of the receiving electronic apparatus to share the video data in a coordinated manner.

2. The electronic apparatus according to claim 1, further comprising a second user-maintained mode for controlling transmission of the other of the first and the second video data streams to the receiving electronic apparatus.

3. The electronic apparatus according to claim 2, further comprising a second display area for viewing a video data stream received from the receiving electronic apparatus.

4. The electronic apparatus according to claim 1, further comprising:
    a speaker for playing one or more of an audio data stream received from the receiving electronic apparatus and an audio data stream transmitted to the receiving electronic apparatus;
    a microphone for recording a first audio data stream;
    a memory for storing a second audio data stream;
    a second user-maintained mode for controlling transmission of one of the first and the second audio data streams when at least the other of the first and the second audio data streams is being transmitted to the electronic apparatus;
    wherein the one of the first and the second audio data streams is suspended while the first user-maintained mode actively senses user feedback.

5. The electronic apparatus according to claim 4, further comprising a third user-maintained mode for controlling transmission of the other of the first and the second audio data streams to the receiving electronic apparatus.

6. The electronic apparatus according to claim 4, further comprising:
    a coordinating mode module to coordinate delivery of multiple streams of data to the transmitting electronic apparatus and the receiving electronic apparatus, wherein the multiple streams of data comprise the video data streams and the audio data stream.

7. The electronic apparatus according to claim 1, wherein the first user-maintained mode is activated as long as the user operating the transmitting electronic apparatus applies sufficient force to cause a button to maintain an active state.

8. The electronic apparatus according to claim 1, wherein the first user-maintained mode is activated as long as the user operating the transmitting electronic apparatus maintains an eye gaze on a target to cause an eye gaze monitor to maintain an active state.

9. The electronic apparatus according to claim 1, wherein the first user-maintained mode is activated as long as the user operating the transmitting electronic apparatus maintains a sound to cause a sound monitor to maintain an active state.

10. The electronic apparatus according to claim 1, wherein the first user-maintained mode is activated as long as the user operating the transmitting electronic apparatus maintains a biological response to cause an affective monitor to maintain an active state.

11. A method for communicating data streams, comprising:
    monitoring a transmitting electronic apparatus and a receiving electronic apparatus in communication;
    recording a first video data stream on the transmitting electronic apparatus;
    storing at least a portion of a second video data stream on the transmitting electronic apparatus;
    displaying one of the first and second video data streams on a first display on the transmitting electronic apparatus; and
    activating a first user-maintained mode initiated by a user on the transmitting electronic apparatus to transmit the one of the first and the second video data streams to the receiving electronic apparatus, wherein the the other of the first and the second video data streams is suspended while the first user-maintained mode actively senses user feedback and further wherein the one of the first and the second video data streams displayed in the first display area is synchronized with the one of the first and the second video data streams transmitted to the receiving electronic apparatus to allow the user of the transmitting electronic apparatus and a user of the receiving electronic apparatus to share the video data in a coordinated manner.

12. The method according to claim 11, further comprising:
controlling transmission of the other of the first and the second video data streams to the receiving electronic apparatus via a second user-maintained mode.

13. The method according to claim 12, further comprising:
providing a second display area on the transmitting electronic apparatus for viewing a video data stream received from the receiving electronic apparatus.

14. The method according to claim 11, further comprising:
playing on the transmitting electronic apparatus, one or more of an audio data stream received from the receiving electronic apparatus and an audio data stream transmitted to the receiving electronic apparatus;
recording a first audio data stream on the transmitting electronic apparatus;
storing a second audio data stream on the transmitting electronic apparatus;
controlling transmission of one of the first and the second audio data streams via a second user-maintained mode when at least the other of the first and the second audio data streams is being transmitted to the receiving electronic apparatus;
wherein the one of the first and the second audio data streams is suspended while the first user-maintained mode actively senses user feedback.

15. The method according to claim 14, further comprising:
controlling transmission of the other of the first and the second audio data streams to the receiving electronic apparatus via a third user-maintained mode.

16. The method according to claim 14, further comprising:
coordinating delivery of multiple streams of data to the transmitting electronic apparatus and the receiving electronic apparatus, wherein the multiple streams of data comprise the video data stream and the audio data stream.

17. The method according to claim 11, wherein the first user-maintained mode is activated as long as the user operating the transmitting electronic apparatus applies sufficient force to cause a button to maintain an active state.

18. The method according to claim 11, wherein the first user-maintained mode is activated as long as the user operating the transmitting electronic apparatus maintains an eye gaze on a target to cause an eye gaze monitor to maintain an active state.

19. The method according to claim 11, wherein the first user-maintained mode is activated as long as the user operating the transmitting electronic apparatus maintains a sound to cause a sound monitor to maintain an active state.

20. The method according to claim 11, wherein the first user-maintained mode is activated as long as the user operating the transmitting electronic apparatus maintains a biological response to cause an affective monitor to maintain an active state.

* * * * *